UNITED STATES PATENT OFFICE.

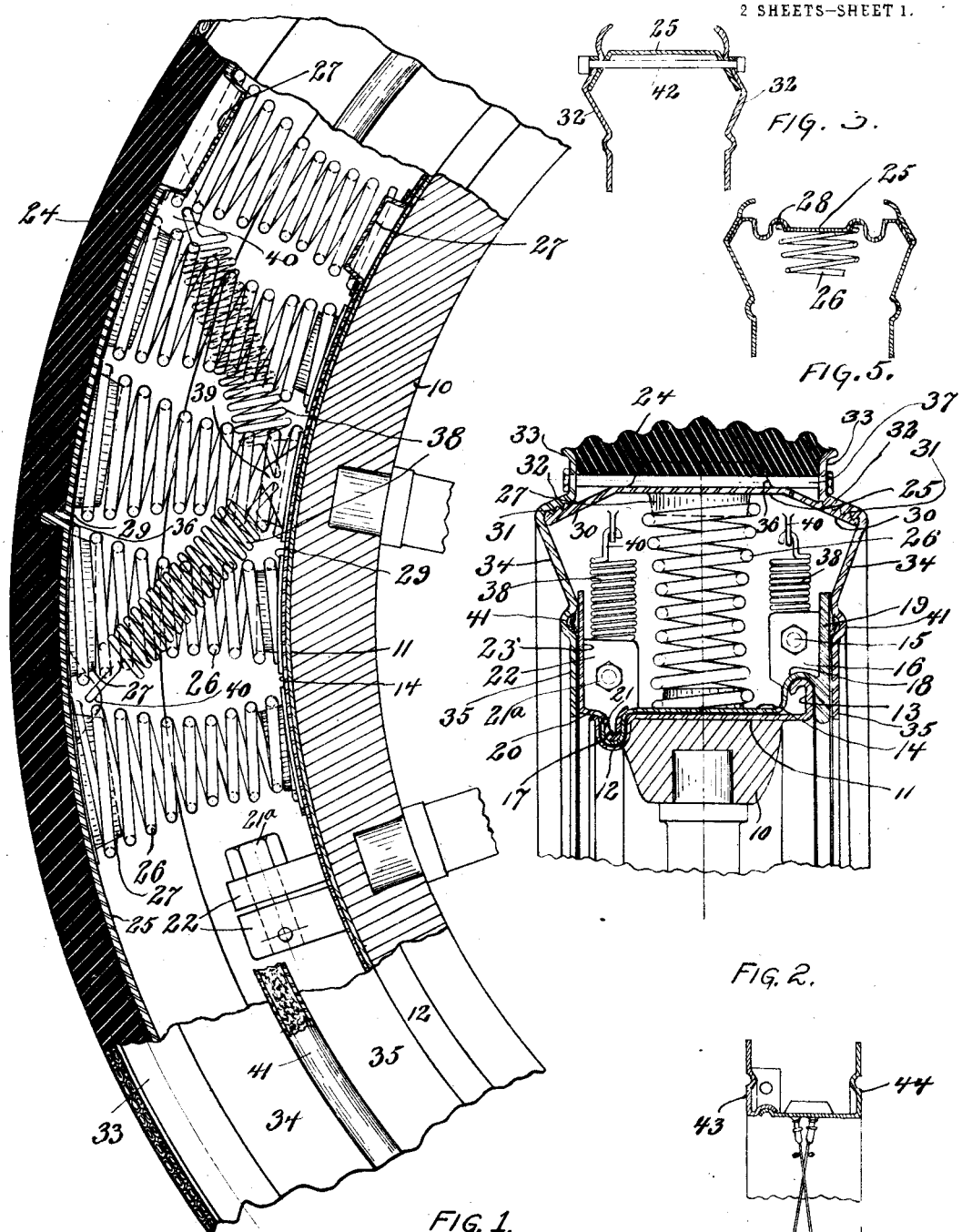

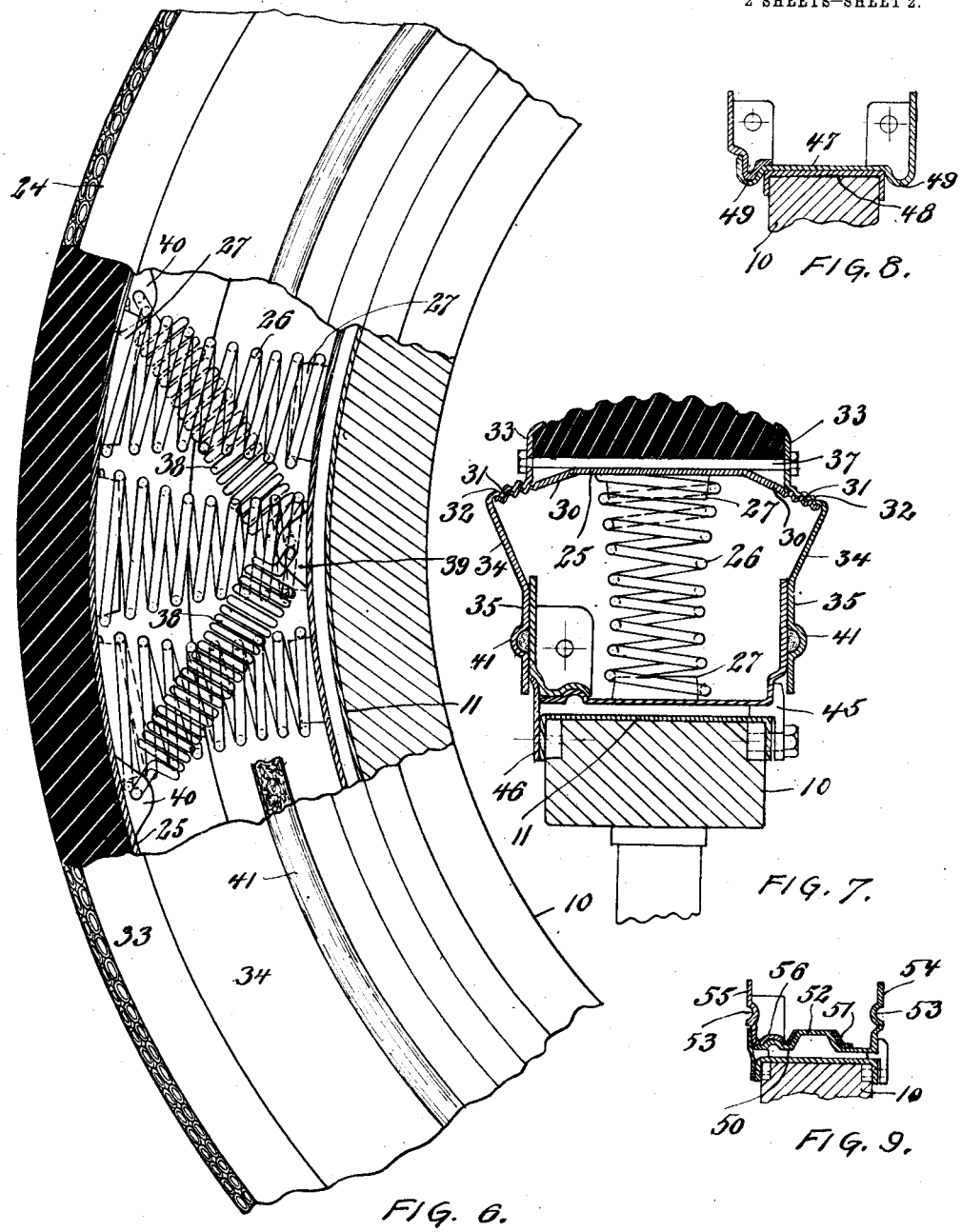

CHARLES A. WHEATON, OF STOCKTON, CALIFORNIA.

SPRING-TIRE.

1,068,720.     Specification of Letters Patent.     Patented July 29, 1913.

Application filed March 25, 1912, Serial No. 686,018. Renewed December 21, 1912. Serial No. 738,080.

*To all whom it may concern:*

Be it known that I, CHARLES A. WHEATON, a citizen of the United States, residing at Stockton, in the county of San Joaquin and State of California, have invented certain new and useful Improvements in Spring-Tires, of which the following is a specification.

This invention relates to that class of vehicle tires in which resiliency is obtained by the use of metallic springs, and its object is to provide in a tire of this kind a novel construction and arrangement of parts to be hereinafter described and claimed, whereby a strong and durable structure is produced, and one which may be applied to any ordinary wheel rim.

The invention has for its object to provide the tire with a demountable tread, and improved means for holding the latter in place.

In order that the invention may be better understood, reference is had to the accompanying drawings forming a part of this specification, in which—

Figure 1 is an elevation of a fragment of the tire, partly broken away. Fig. 2 is a transverse section of the tire. Figs. 3, 4 and 5 are transverse sectional views showing modifications. Fig. 6 is an elevation of a fragment of a tire, partly broken away, showing another modification. Fig. 7 is a transverse section of the tire shown in Fig. 6. Figs. 8 and 9 are sectional views showing further modifications.

Referring specifically to the drawing, 10 denotes the felly of a wheel, on the outer periphery of which is mounted a fixed rim 11 having at one of its edges a continuous annular channel 12, and at its other edge an outstanding annular rib 13. This rim carries a second rim 14 which is in two sections, connected by a bolt 15 passing through lugs 16 on the abutting ends of the sections. The rim 14 is formed on one side with a continuous rib 17 which fits in the channel 12, and on the other side of said rim is a continuous channel 18 to receive the rib 13. The last-mentioned side of the rim 14 also has an outstanding radial flange 19.

On that side of the rim 14 which has the rib 17 is located a ring 20 having a rib 21 which fits in the channel formed by the rib 17. This ring 20 is also in two sections which are connected by bolts 21ᵃ and passing through lugs 22 on the abutting ends of the sections. The ring 20 has an outstanding radial flange 23. This flange and the flange 19 are on opposite sides of the felly and extend entirely around the same.

The tread of the tire is a band 24 of any suitable wearing material having a roughened surface to prevent skidding and to give a better traction surface. The tread is mounted on a ring 25 which is held normally concentric and in spaced relation with respect to the rim 14 by means of a series of double helico-volute springs 26 arranged radially between said parts. The ends of the springs fit over bosses 27, whereby they are retained in place. Figs. 1 and 2 show the bosses 27 formed integral with the rim 14 and the ring 25 by being struck up therefrom. Fig. 5 shows a circular groove 28 made in the ring 25 for retaining one end of the spring. As shown in Fig. 1, washers 29 of suitable sound-deadening material may be interposed between the inner ends of the springs and the ring 25 and rim 14 to take up wear and eliminate the scratching noise from the action of the springs.

The ring 25 has inward bends 30 which project beyond the plane of the edges of the tread 24 and are screw-threaded as indicated at 31 to receive clips for holding the tread. These clips are rings 32 which are threaded to screw on the threaded parts 30, and have each an outstanding radial flange 33. The tread 24 fits between the flanges 33 and is held thereby against lateral displacement. The rings 32 also have an inwardly extending and inclined flange 34 terminating in a straight portion 35. The part 35 of one of the rings engages the outer surface of the flange 19 with a sliding fit, and the part 35 of the other ring similarly engages the flange 23, thereby guiding and permitting the relative movement of the parts which carry the tread and the parts which are mounted on the felly 10. At suitable intervals the outer periphery of the ring 25 has transverse ribs 36 which seat in corresponding grooves in the base of the tread 24, whereby the latter is prevented from creeping. A bolt 37 passes through the flanges 33 to prevent unscrewing of the rings 32. Between the rings 25 and the rim 14 are also interposed coiled springs 38 which are provided to relieve the springs 26 of the driving strain, and to prevent slipping and creeping of the ring 25 and the parts carried thereby, and also to overcome the sudden stoppage when applying a brake. The springs 38 are arranged in pairs, the members of each pair being secured at their inner ends to a lug 39 on the rim 14, and at their outer ends to lugs 40 on the ring 25. The springs extend obliquely between these parts, and alternately in opposite directions, so that they operate irrespective of the direction in which the wheel is turning.

The structure herein described forms a casing inclosing the springs, and in order to exclude dust, dirt, etc., therefrom, the parts 35 which engage the flanges 19 and 23 have an annular groove 41 to receive a packing material. When the tread 24 becomes worn, it can be readily removed and renewed by unscrewing one of the rings 32.

Fig. 3 shows the rings 25 and 32 secured together by a bolt 42, the screw joint being dispensed with.

Fig. 4 shows a structure more especially adapted for bicycle and motor-cycle wheels, the sectional channel members 43 and 44 forming the felly of the wheel.

Figs. 6 and 7 show the invention applied to an ordinary demountable rim, the parts being held on one side by a clip 45 and on the other side by a ring 46.

Fig. 8 shows a demountable rim member 47 held in place on a fixed rim 48 by means of annular ribs 49 between which the latter fits.

Fig. 9 shows a demountable rim-member 50 with a fiber washer 51 and a retaining lug 52 for one end of the springs 26. A packing groove 53 is formed in the flange 54 of the member 50 and in the flange 55 of the companion member 56.

Various other changes and modifications in the structural details may be made without a departure from the spirit and scope of the invention.

I claim:

1. The combination with a wheel felly; of a pair of superposed rims mounted thereon, the inner rim having a continuous channel at one of its edges and an outstanding rib at its other edge, and the outer rim having on one side a rib which fits in the aforesaid channel, and at its other side a channel to receive the first-mentioned rib, and said outer rim also having at one of its edges an outstanding radial flange; a ring carried by the the outer rim at its other edge, said ring having an outstanding radial flange; a tread, a ring carrying the tread; springs interposed between the tread-carrying ring and the aforesaid outer rim; and tread-holding clips mounted on the tread-carrying ring, and having side flanges which are in sliding engagement with the first-mentioned flanges.

2. The combination with a wheel felly; of a pair of superposed rims mounted thereon, the outer rim having an outstanding flange at one of its edges; a ring carried by the outer rim at its other edge and having an outstanding flange; a tread; a ring carrying the tread; springs interposed between the tread-carrying ring and the aforesaid outer rim; and tread-holding clips removably mounted on the tread-carrying ring and having side flanges in sliding engagement with the first-mentioned flanges.

3. The combination with a wheel felly; of a rim mounted thereon, and having outstanding flanges at its edges; a tread; a ring carrying the tread and projecting from opposite edges of the tread, said projecting portions of the ring being screw-threaded; springs interposed between the rim and the ring; and rings screwed on the projecting threaded portions of the tread-carrying ring, and having flanges which engage the sides of the tread, and said second-mentioned rings also having flanges which are in sliding engagement with the first-mentioned flanges.

In testimony whereof I affix my signature in presence of two witnesses.

CHARLES A. WHEATON.

Witnesses:
  CHAS. H. YOUNG,
  LEOTA ROOT.